United States Patent
Tsirkin

(10) Patent No.: US 9,672,056 B2
(45) Date of Patent: Jun. 6, 2017

(54) REDUCING REDUNDANT NETWORK TRANSMISSIONS IN VIRTUAL MACHINE LIVE MIGRATION

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 190 days.

(21) Appl. No.: 14/167,141

(22) Filed: Jan. 29, 2014

(65) Prior Publication Data
US 2015/0212846 A1 Jul. 30, 2015

(51) Int. Cl.
*G06F 12/00* (2006.01)
*G06F 9/455* (2006.01)

(52) U.S. Cl.
CPC .. *G06F 9/45558* (2013.01); *G06F 2009/4557* (2013.01); *G06F 2009/45583* (2013.01)

(58) Field of Classification Search
CPC .... G06F 3/0689; G06F 3/067; G06F 11/1076; G06F 3/0647; G06F 3/0613; G06F 9/4856; G06F 3/061
USPC ........................................................ 711/114
See application file for complete search history.

(56) References Cited

U.S. PATENT DOCUMENTS

| | | | |
|---|---|---|---|
| 7,484,208 B1 * | 1/2009 | Nelson ................ | G06F 9/45558 711/6 |
| 8,386,612 B2 | 2/2013 | Dorai et al. | |
| 8,413,145 B2 | 4/2013 | Chou et al. | |
| 8,473,557 B2 | 6/2013 | Ramakrishnan et al. | |
| 2010/0082922 A1 * | 4/2010 | George ................... | G06F 9/461 711/162 |
| 2012/0017031 A1 | 1/2012 | Mashtizadeh et al. | |

(Continued)

OTHER PUBLICATIONS

"Virtual Machine to Physical Machine Migration", VMware, inc., Copyright 1998-2004 http://www.vmware.com/support/v2p/doc/V2P_TechNote.pdf, last accessed Feb. 3, 2014.

(Continued)

*Primary Examiner* — Prasith Thammavong
*Assistant Examiner* — Edmund Kwong
(74) *Attorney, Agent, or Firm* — Lowenstein Sandler LLP

(57) ABSTRACT

Systems and methods for reducing redundant network transmissions in virtual machine live migration. An example method may comprise: reading, by a hypervisor running on a first computer system, from a memory mapped into an address space of a virtual machine undergoing live migration from the first computer system to a second computer system, a data structure comprising a plurality of records, each record mapping an address of a memory page to an identifier of a virtual disk frame storing contents of the memory page; reading a plurality of page modification flags, each page modification flag indicating that contents of a corresponding memory page differ from contents of a virtual disk frame referenced by the data structure; responsive to determining that a memory page is referenced by the data structure and that a page modification flag corresponding to the memory page is set, transmitting the memory page to the second computer system; and responsive to determining that a memory page is not referenced by the data structure, transmitting the memory page to the second computer system.

17 Claims, 3 Drawing Sheets

(56) References Cited

U.S. PATENT DOCUMENTS

| | | | |
|---|---|---|---|
| 2012/0054409 A1 | 3/2012 | Block et al. | |
| 2013/0036128 A1* | 2/2013 | Ben-Tsion | G06F 13/00 707/756 |
| 2013/0205106 A1* | 8/2013 | Tati | G06F 3/061 711/159 |
| 2013/0346613 A1* | 12/2013 | Tarasuk-Levin | G06F 9/45558 709/226 |
| 2014/0196037 A1* | 7/2014 | Gopalan | G06F 9/4856 718/1 |
| 2015/0135175 A1* | 5/2015 | Bacher | G06F 9/45558 718/1 |
| 2015/0205542 A1* | 7/2015 | Antony | G06F 3/0647 711/162 |

OTHER PUBLICATIONS

"Linked Virtual Machines", VMware, Inc., Copyright 2009 http://www.vmware.com/support/developer/vc-sdk/linked_vms_note.pdf.

"Consolidating Snapshots in ESX/ESXi 3.x and 4.x (1007849)", http://kb.vmware.com/selfservice/microsites/search.do?language=en_US&cmd=displayKC&externalId=1007849, Updated Jul. 21, 2013.

* cited by examiner

REDUCING REDUNDANT NETWORK TRANSMISSIONS IN VIRTUAL MACHINE LIVE MIGRATION

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for reducing redundant network transmissions in virtual machine live migration. "Live migration" herein refers to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

As the execution state of a virtual machine being migrated may have a size of several gigabytes, the network throughput may become a constraint, especially when several virtual machines are being migrated concurrently. In order to improve the overall efficiency of the live migration process, the amount of data transmitted over the network may be optimized in accordance with one or more aspect of the present disclosure.

In certain implementations, a migration agent may copy the execution state of the virtual machine being migrated, including a plurality of memory pages, from the origin host to the destination host while the virtual machine is still running at the origin host. Independently of the migration process, the running virtual machine may "launder" memory pages by copying the memory contents into a backing store. In certain implementations, the backing store may be provided by a virtual disk exposed to the virtual machine and accessible via a network (e.g., a storage area network (SAN) or a network attached storage (SAN)). Hence, in conventional migration methods, each laundered memory page may be sent over the network twice.

Aspects of the present disclosure address the above noted and other deficiencies by excluding the redundant transmission over the network of memory pages that have been laundered to a virtual disk accessible over a network. In an illustrative example, a virtual machine may maintain in its memory a data structure comprising a plurality of records corresponding to the laundered memory pages. Each record may map a memory page address to an identifier of the virtual disk frame where the contents of the memory page are stored. Each mapping may further comprise a page modification flag indicating whether the contents of the memory page differ from the contents of the virtual disk frame. The origin hypervisor may read the data structure from the guest memory and transmit to the destination host only those memory pages that are either missing from the data structure or have the page modification flag set, as described in more details herein below. Various aspects of the above referenced methods and systems are described in details herein below by way of examples, rather than by way of limitation.

Figure 1:
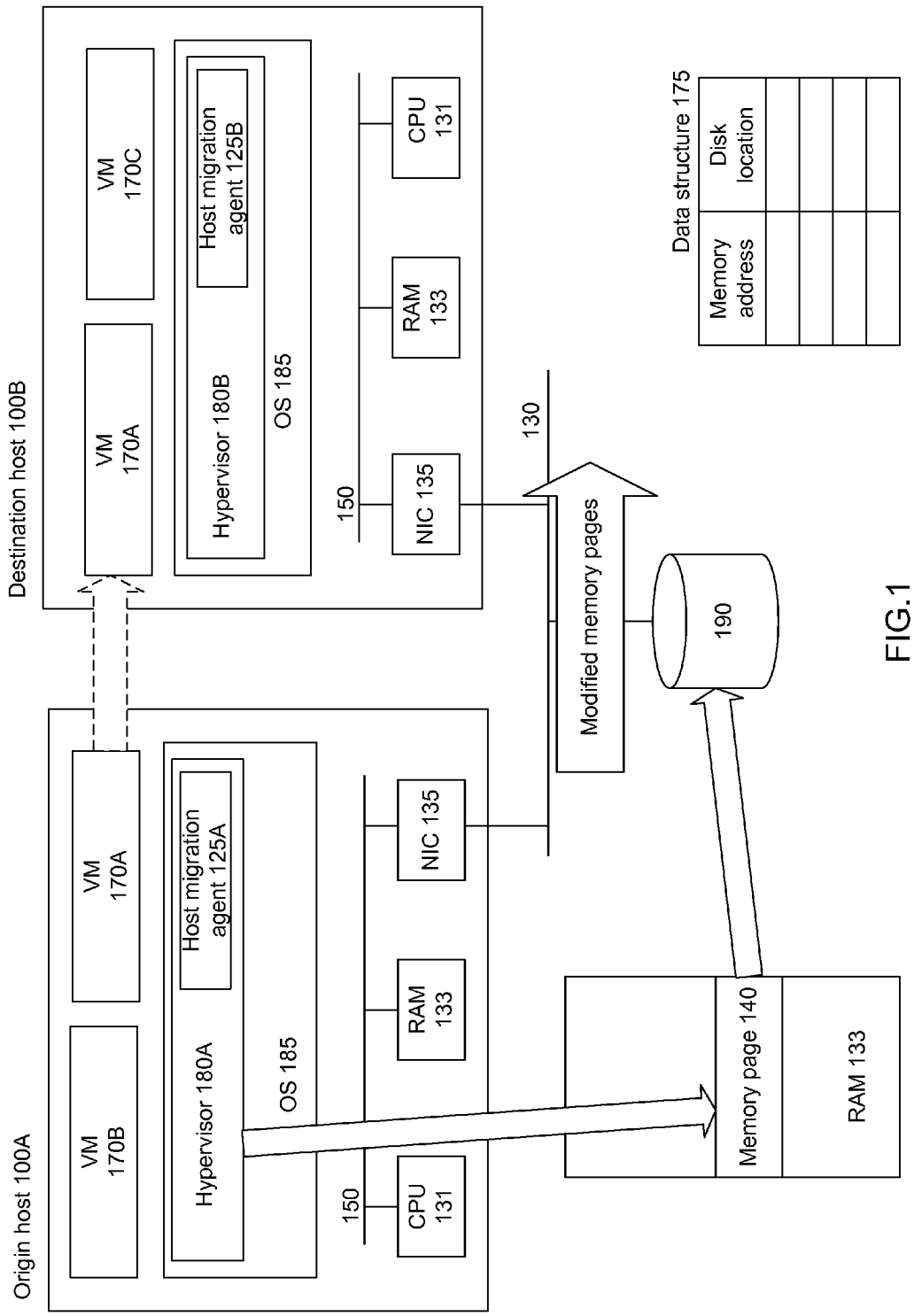
FIG. 1 depicts a high-level component diagram of one illustrative embodiment of a distributed computer system in accordance with one or more aspects of the present disclosure.

FIG. 1 depicts a high-level component diagram of one illustrative example of a computer system 100A, 100B in accordance with one or more aspects of the present disclosure. "Computer system" herein shall refer to a system comprising one or more processors, one or more memory devices, and one or more input/output (I/O) interfaces.

Computer system 100A, 100B may be interconnected, via a network 130, with one or more remote computers. Computer system 100A, 100B may comprise one or more processors 131 communicatively coupled to a memory device 133 and a network interface controller (NIC) 135. Local connections within host computer system 100A, 100B, including connections between processor 131, memory device 133, and NIC 135, may be provided by one or more local buses 150 of a suitable architecture.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data.

In an illustrative example, as schematically illustrated by FIG. 1, computer system 100A, 100B may run multiple virtual machines 170 by executing a software layer 180, often referred to as "hypervisor," above the hardware and below the virtual machines. In certain implementations, hypervisor 180 may be a component of operating system 185 executed by host computer system 100A, 100B. Alternatively, hypervisor 180 may be provided by an application running under host operating system 185, or may run directly on the host computer system 100A, 100B without an operating system beneath it. Hypervisor 180 may abstract the physical layer, including processors, memory, and I/O devices, and present this abstraction to virtual machines 170 as virtual devices, including virtual processors, virtual memory, and virtual I/O devices. Host migration agents 125A, 125B running on host computer system 100A, 100B may perform virtual machine migration management functions in accordance with one or more aspects of the present disclosure. In certain implementations, a host migration agent may be implemented as a software component invoked by hypervisor 180. Alternatively, functions of host migration agent 125 may be performed by hypervisor 180.

The address space virtualization may be handled through the paging mechanism implemented to support a virtual memory environment where a virtual machine address space is simulated with a smaller amount of random access memory (RAM) and a backing store. In certain implementations, the backing store may be provided by a virtual disk exposed to the virtual machine and accessible via a network. The memory may be divided into pages of a defined size (e.g., 4 KB) which may be stored on a virtual disk exposed to the virtual machine and accessible via a network. The guest operating system may maintain a page directory and a set of page tables to keep track of the pages. When a virtual machine attempts to access a memory page, it may use the page directory and page tables to translate the virtual address into a physical address. If the page being accessed is not currently in the physical memory, a page-fault exception may be generated, responsive to which the virtual machine may read the page from the virtual disk and continue executing the thread.

In certain implementations, running virtual machines 170 may "launder" memory pages by copying the memory contents into a backing store provided by a virtual disk 190. In an illustrative example, virtual disk 190 may reside on a network attached storage (NAS) system comprising one or more storage servers each coupled to one or more persistent data storage devices, such as magnetic or optical storage disks, solid-state drives (SSDs), etc. Alternatively, virtual disk 190 may be represented by a storage area network (SAN) comprising a plurality of persistent data storage devices providing a block-level data storage.

In an illustrative example, virtual machine 170A may be undergoing live migration from origin host computer system 100A to destination host computer system 100B, as schematically illustrated by FIG. 1. Live migration may involve copying the virtual machine execution state from the origin host to the destination host. The virtual machine execution state may comprise the memory state, the virtual processor state, the virtual devices state, and/or the connectivity state. Host migration agent 125A may manage copying, over network 130, the execution state of migrating virtual machine 170A, including a plurality of memory pages 140, from origin host 100A to destination host 100B while virtual machine 170A is still running on origin host 100A.

Independently of the migration process, the running virtual machine may "launder" virtual memory pages by copying the memory contents into the backing store provided by virtual disk 190. In certain implementation, the virtual machine may maintain in its memory a data structure 175 comprising a plurality of records corresponding to the laundered memory pages.

Each record of data structure 175 may comprise a bi-directional mapping of a memory page address to an identifier of the virtual disk frame where the contents of the memory page are stored. Each record may further comprise a page modification flag indicating whether the contents of the memory page differ from the contents of the virtual disk frame. In an illustrative example, the flag may be set if the contents of the memory page is identical to the contents of the corresponding virtual disk frame, and may be cleared otherwise. The virtual machine may set the page modification flag responsive to modifying or detecting modification of either the memory page or the contents of the virtual disk frame. The virtual machine may further clear the page modification flag upon laundering the modified memory page to the virtual disk.

In certain implementations, the above referenced data structure may be provided by two or more data structures, for example, a first data structure comprising a plurality of mappings of memory page addresses to identifiers of the virtual disk frames, and a second data structure comprising a plurality of page modification flags corresponding to the memory pages. The page modification flags may be maintained by the guest operating system and/or by the virtual machine's CPU. Hence, in an illustrative example, the above referenced data structure may be provided by three data structures, including a first data structure comprising a plurality of mappings of memory page addresses to identifiers of the virtual disk frames, a second data structure comprising a plurality of page modification flags maintained by the guest operating system, and a third data structure comprising a plurality of page modification flags maintained by the virtual CPU.

To exclude redundant transmissions over the network of memory pages that have been laundered to a network-accessible virtual disk, host migration agent 125A may read data structure 175 from the guest memory, and transmit to the destination host only those memory pages that are either not found in the data structure or have the page modification flag set. In an illustrative example, host migration agent 125A may cycle through the virtual machine memory pages and determine, for each memory page, whether the memory page is found in the data structure. If so, host migration agent 125A may inspect the page modification flag. If the page modification flag is not set, the memory page contents do not need to be transmitted over the network to the destination host, as the destination host may retrieve the memory page contents from the virtual disk. If the page modification flag is set, or if the page could not be found in the data structure, host migration agent 125A may transmit the memory page to the destination host.

In certain implementations, origin host migration agent 125A may notify the destination host of the addresses of the guest memory pages the contents of which may be retrieved from the virtual disk. Alternatively, destination hypervisor 180B may periodically inspect data structure 175 residing in the guest memory at the destination host.

Destination hypervisor 180B may read data structure 175 from the guest memory at the destination host. For each data structure record, destination hypervisor 180B may read the memory page contents from the virtual disk frame specified by the data structure record, store the memory page in the host memory, and map the memory page into the virtual machine address space using the guest address specified by the data structure record. For the memory pages the contents of which have been received over the network, destination hypervisor 180B may store the memory page in the host memory, and map the memory page into the virtual machine address space using the guest address specified by the origin hypervisor.

Figure 2:
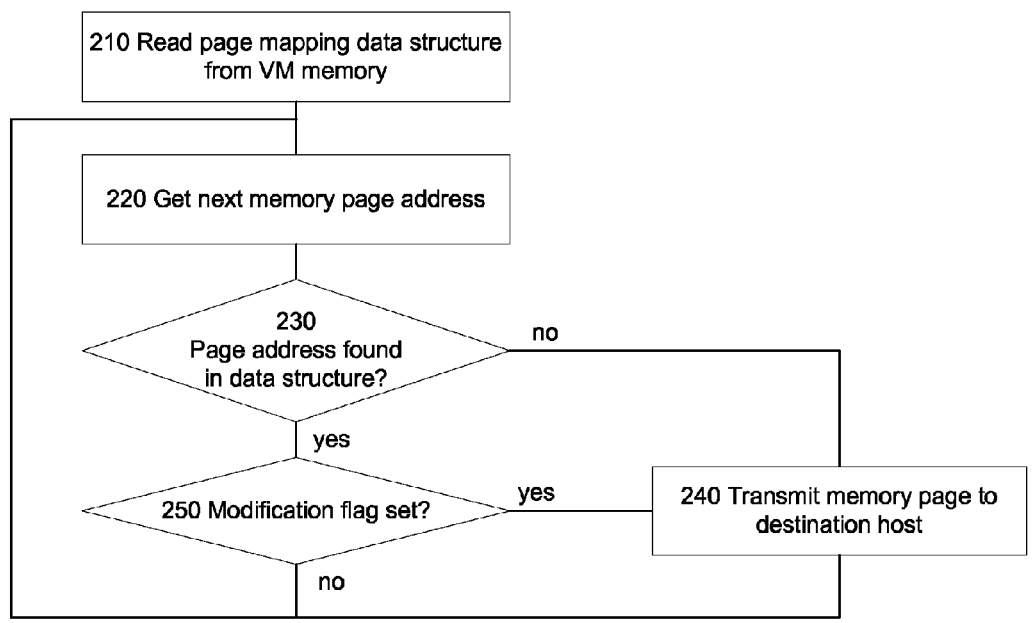
FIG. 2 depicts a flow diagram of an example method for reducing redundant network transmissions in virtual machine live migration, in accordance with one or more aspects of the present disclosure.

FIG. 2 depicts a flow diagram of an example method 200 for reducing redundant network transmissions in virtual machine live migration. Method 200 may be performed by a computer system that may comprise hardware (e.g., circuitry, dedicated logic, and/or programmable logic), software (e.g., instructions executable on a computer system to perform hardware simulation), or a combination thereof. Method 200 and/or each of its individual functions, routines, subroutines, or operations may be performed by one or more processors of the computer system executing the method (e.g., computer system 100A of FIG. 1). In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the host migration agent may read, from the virtual machine memory, a data structure mapping, for a plurality of laundered memory pages, guest memory addresses to virtual disk frames. Each record of the data structure may comprise a bi-directional mapping of a memory page address to an identifier of the virtual disk frame where the contents of the memory page are stored. In certain implementations, each record may further comprise a page modification flag indicating whether the contents of the memory page differ from the contents of the virtual disk frame. Alternatively, the above referenced data structure may be provided by two or more data structures, as described in more details herein above.

At blocks 220-250, the origin host migration agents may cycle through memory pages of a virtual machine undergoing live migration to the destination host. In an illustrative example, the origin host migration agent may cycle through all memory pages of the virtual machine. Alternatively, the origin host migration agent may cycle through a subset of memory pages of the virtual machine.

Responsive to determining, at block 230, that the address of the guest memory page that is being processed by the current iteration of the memory page transmission cycle (blocks 220-250) could not be found in the above referenced data structure, the host migration agent may, at block 240, transmit the memory page to the destination host over the network, and loop back to block 220.

If the guest memory page address is found in the above identified data structure, the host migration agent may determine whether the page modification flag corresponding to the memory page is set. Responsive to determining, at block 250, that the page modification flag corresponding to the memory page is set, the host migration agent may, at block 240, transmit the memory page to the destination host over the network, and loop back to block 220.

Responsive to ascertaining that the guest memory page address is found in the above referenced data structure, and the page modification flag corresponding to the memory page is not set, the host migration agent determine that the memory page contents may be retrieved by the destination host from the virtual disk frame specified by the data structure, and hence should not be transmitted to the destination over the network.

Figure 3:
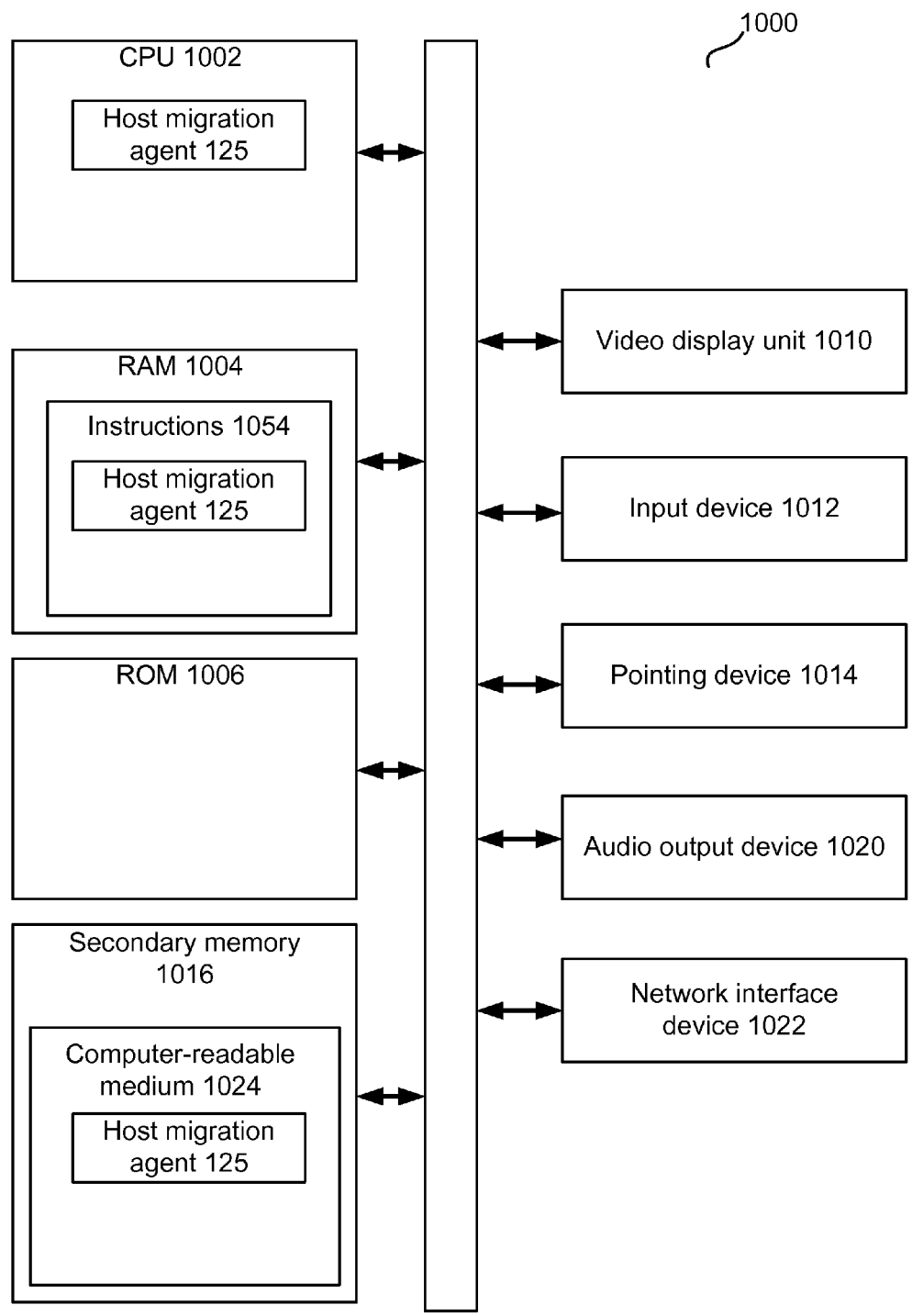
FIG. 3 depicts a block diagram of an illustrative computer system operating in accordance with the examples of the present disclosure.

FIG. 3 depicts an example computer system 1000 within which a set of instructions, for causing the computer system to perform any one or more of the methods described herein, may be executed. In certain implementations, computer system 1000 may correspond to computer system 100A, 100B of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface device 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions of host migration agent 125 implementing method 200 for reducing redundant network transmissions in virtual machine live migration. Instructions of host migration agent 125 may also reside, completely or partially, within the main memory 1004 and/or within processor 1002 during execution thereof by computer system 1000, hence, main memory 1004 and processor 1002 may also constitute machine-readable storage media.

While computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:

reading, by a processor of a destination computer system, from a memory mapped into an address space of a virtual machine undergoing live migration from an origin computer system to the destination computer system, a data structure comprising a plurality of records, each record mapping an address of a memory page to an identifier of a virtual disk frame storing contents of the memory page, wherein the virtual disk frame is stored on a virtual disk that is employed by the virtual machine as a backing store for storing contents of memory pages, wherein the identifier of the virtual disk frame comprises an offset of the frame on the virtual disk, and wherein the virtual disk is accessible over a network by both the origin computer system and the destination computer system;

reading, by the processor, from the memory mapped into the address space of the virtual machine, a plurality of page modification flags, each page modification flag indicating that contents of a corresponding memory page differ from contents of a virtual disk frame referenced by the data structure; and responsive to determining that a memory page is referenced by the data structure and that a page modification flag corresponding to the memory page is cleared, reading contents of the memory page from the virtual disk frame identified by the data structure.

2. The method of claim 1, further comprising:

responsive to determining that the memory page is referenced by the data structure and that the page modification flag corresponding to a memory page is clear, receiving the contents of the memory page from the origin computer system.

3. The method of claim 1, wherein determining that the memory page is referenced by the data structure comprises cycling through a subset of memory pages mapped into the address space of the virtual machine.

4. The method of claim 1, wherein the data structure is provided by two or more data structures.

5. The method of claim 1, wherein the identifier of the virtual disk frame further comprises an identifier of the virtual disk.

6. The method of claim 1, wherein the virtual disk resides on one of: a network attached storage (NAS) system or a storage area network (SAN) system.

7. A destination computer system, comprising:

a memory; and a processor, operatively coupled to the memory, to:

read from a memory mapped into an address space of a virtual machine undergoing live migration from an origin computer system to the destination computer system, a data structure comprising a plurality of records, each record mapping an address of a memory page to an identifier of a virtual disk frame storing contents of the memory page, wherein the virtual disk frame is stored on a virtual disk that is employed by the virtual machine as a backing store for storing contents of memory pages, wherein the identifier of the virtual disk frame comprises an offset of the frame on the virtual disk, and wherein the virtual disk is accessible over a network by both the origin computer system and the destination computer system;

read from the memory mapped into the address space of the virtual machine, a plurality of page modification flags, each page modification flag indicating that contents of a corresponding memory page differ from contents of a virtual disk frame referenced by the data structure; and responsive to determining that a memory page is referenced by the data structure and that a page modification flag corresponding to the memory page is cleared, read contents of the memory page from the virtual disk frame identified by the data structure.

8. The system of claim 7, wherein the processor is further to:

responsive to determining that the memory page is referenced by the data structure and that the page modification flag corresponding to a memory page is clear, receive the contents of the memory page from the origin computer system.

9. The system of claim 7, wherein to determine that the memory page is referenced by the data structure, the processor is to cycle through a subset of memory pages mapped into the address space of the virtual machine.

10. The system of claim 7, wherein the data structure is provided by two or more data structures.

11. The system of claim 7, wherein the identifier of the virtual disk frame further comprises an identifier of the virtual disk.

12. The system of claim 7, wherein the virtual disk resides on one of: a network attached storage (NAS) system or a storage area network (SAN) system.

13. A computer-readable non-transitory storage medium comprising executable instructions that, when executed by a processor of a destination computer system, cause the processor to:

read, by the processor, from a memory mapped into an address space of a virtual machine undergoing live migration from an origin computer system to the destination computer system, a data structure comprising a plurality of records, each record mapping an address of a memory page to an identifier of a virtual disk frame storing contents of the memory page, wherein the virtual disk frame is stored on a virtual disk that is employed by the virtual machine as a backing store for storing contents of memory pages, wherein the identifier of the virtual disk frame comprises an offset of the frame on the virtual disk, and wherein the virtual disk is accessible over a network by both the origin computer system and the destination computer system;

read, by the processor, from the memory mapped into the address space of the virtual machine, a plurality of page modification flags, each page modification flag indicating that contents of a corresponding memory page differ from contents of a virtual disk frame referenced by the data structure; and responsive to determining that a memory page is referenced by the data structure and that a page modification flag corresponding to the memory page is cleared, read contents of the memory page from the virtual disk frame identified by the data structure.

14. The computer-readable non-transitory storage medium of claim 13, further comprising executable instructions causing the processor to:

responsive to determining that the memory page is referenced by the data structure and that the page modification flag corresponding to a memory page is clear, receive the contents of the memory page from the origin computer system.

15. The computer-readable non-transitory storage medium of claim 13, wherein executable instructions causing the processor to determining that the memory page is referenced by the data structure further comprise executable instructions causing the processor to cycle through a subset of memory pages mapped into the address space of the virtual machine.

16. The computer-readable non-transitory storage medium of claim 13, wherein the data structure is provided by two or more data structures.

17. The computer-readable non-transitory storage medium of claim 13, wherein the virtual disk resides on one of: a network attached storage (NAS) system or a storage area network (SAN) system.

* * * * *